(12) United States Patent
Moens

(10) Patent No.: US 8,637,581 B2
(45) Date of Patent: Jan. 28, 2014

(54) POLYESTERS FOR COATINGS

(75) Inventor: Luc Moens, Sint-Genesius-Rode (BE)

(73) Assignee: Cytec Surface Specialties, S.A., Brussels (BE)

( * ) Notice: Subject to any disclaimer, the term of this patent is extended or adjusted under 35 U.S.C. 154(b) by 0 days.

(21) Appl. No.: 13/497,600

(22) PCT Filed: Nov. 12, 2010

(86) PCT No.: PCT/EP2010/067367
§ 371 (c)(1),
(2), (4) Date: Mar. 22, 2012

(87) PCT Pub. No.: WO2011/058130
PCT Pub. Date: May 19, 2011

(65) Prior Publication Data
US 2012/0220676 A1    Aug. 30, 2012

(30) Foreign Application Priority Data

Nov. 13, 2009   (EP) .................................... 09175912

(51) Int. Cl.
*C08J 9/00*   (2006.01)
*C08J 11/04*   (2006.01)

(52) U.S. Cl.
USPC ........................................................ 521/48.5

(58) Field of Classification Search
USPC ........................................................ 521/48.5
See application file for complete search history.

(56) References Cited

U.S. PATENT DOCUMENTS

| | | | |
|---|---|---|---|
| 5,639,560 A | 6/1997 | Moens et al. | |
| 5,959,066 A | 9/1999 | Charbonneau et al. | |
| 6,048,936 A | 4/2000 | Epple et al. | |
| 6,126,992 A | 10/2000 | Khanarian et al. | |
| 6,258,897 B1 | 7/2001 | Epple et al. | |
| 2002/0022695 A1 | 2/2002 | Ueno et al. | |
| 2002/0115817 A1 | 8/2002 | Hayes | |
| 2004/0092703 A1 | 5/2004 | Germroth et al. | |
| 2010/0160548 A1 | 6/2010 | Noordover et al. | |

FOREIGN PATENT DOCUMENTS

| | | |
|---|---|---|
| EP | 0 776 920 | 6/1997 |
| EP | 0 896 991 | 2/1999 |
| EP | 1 149 874 | 10/2001 |
| WO | 91/01748 | 2/1991 |
| WO | 2006/102279 | 9/2006 |
| WO | 2008/031592 | 3/2008 |
| WO | 2009/095460 | 8/2009 |
| WO | 2010/069531 | 6/2010 |

OTHER PUBLICATIONS

Ramesh M Gohil; Properties and strain hardening character of polyethylene terephthalate containing Isosorbide; Pol Eng Sci 49(3):544-553 (2009).*
International Search Report issued Jan. 25, 2011 in International (PCT) Application No. PCT/EP2010/067367.

* cited by examiner

*Primary Examiner* — Terressa Boykin
(74) *Attorney, Agent, or Firm* — Wenderoth, Lind & Ponack, L.L.P.

(57) ABSTRACT

The present invention relates to polyesters that can be prepared from renewable resources and/or recycled materials and the production process thereof. In particular, hydroxyl-functional or carboxyl-functional polyesters containing moieties of terephthalic acid and/or isophthalic acid, ethylene glycol, a dianhydrohexitol, and of one or more linear chain dicarboxylic acids are provided. Further, the polyesters have a number average molecular weight, as measured by gel permeation chromatography, of from 400 to 15000 daltons, more preferably from 550 to 15000 daltons. The polyesters of the invention can basically be prepared from recycled polyethylene terephthalate and from renewable polyacids and/or polyols. The present invention further provides a process to produce such polyesters via glycolysis of a polyethylene terepthalate and/or a polyethylene isophthalate with a dianhydrohexitol.

18 Claims, No Drawings

POLYESTERS FOR COATINGS

This application is a U.S. national stage of International Application No. PCT/EP2010/067367 filed Nov. 12, 2010.

The present invention relates to polyesters that can be prepared from renewable resources and/or recycled materials, to their use and their production process.

Carboxyl-, hydroxyl- and (meth)acryloyl-functional polyesters and their use in resins and/or binders for coatings have been widely described.

Most of their raw materials principally are derived from non-renewable resources. Non-renewable resources are taken from the earth, and once taken they are not replaced.

A sustainable path forward in replacing some non-renewable resources is recycling, meaning that starting materials are recovered from their prior use to be used again.

The use of polyethylene terephthalate (PET) film or bottle scrap has been described in various applications including polyesters for powder coatings.

DD 295,647 relates to the synthesis of carboxyl functional polyesters for powder coatings obtained from reacting high number average molecular weight PET waste polyacids and polyols.

DE 1,913,923 discloses thermosetting polyterephthalate binders prepared from mixing a hydroxyl functional polyterephthalate and a carboxyl functional polyterephthalate. Both polyterephthalates are obtained from glycolysis of PET with alcohols.

Non-renewable resources may also be replaced (partially or completely) by renewable resources. The interest of the industry for renewable resources is driven by an awareness of the environmental consequences of depletion of feedstock based on fossil fuels.

WO 2008/031592 discloses a process for the production of a polyester from a mixture of isoidide, and a dicarboxylic acid or dicarboxylic acid anhydride. Only coatings obtained from polyesters made from succinic acid as sole polyacid and from isosorbide as sole polyol have a flexibility and glass transition temperature acceptable for powder coatings.

In WO 2006/102279 the use of isoidide and isosorbide in the production of polyesters is described. Reaction temperatures of 280° C. and higher are reported therein.

There is a continued demand for polyesters that can be prepared from recycled materials and/or renewable resources in an easy way and that can be used in various types of coatings.

Against this background we now provide polyesters comprising moieties of terephthalic acid and/or isophthalic acid, of ethylene glycol, of a dianhydrohexitol (e.g. isosorbide), and, advantageously, of one or more linear chain dicarboxylic acids.

By "moieties" as used herein is meant monomer units.

Advantageously the polyesters of the invention are non-thermoplastic. Preferred are thermosetting polyesters, but radiation curable polyesters are also possible.

Polyesters of the invention can be used as part of the binder system of coatings, of which powder coatings are just one example. The polyesters according the present invention can, however, also be used in a liquid coating composition. The liquid coating composition according to the invention may be water-borne or solvent-borne.

Further provided in the invention is a process to produce polyesters of the invention.

In particular there is provided a process to produce a polyester, said process comprising a step of (1) glycolysis of a polyethylene terephthalate and/or a polyethylene isophthalate with a dianhydrohexitol, followed, where needed, by (2) one or more additional steps, more in particular one or more additional reaction steps. In step (1) one or more other polyols (e.g. glycerol and/or sorbitol) can be used in addition to the dianhydrohexitol (e.g. isosorbide).

With a process of the invention polyesters can be produced that are hydroxyl-functional or carboxyl-functional, and that have a number average molecular weight (Mn), as measured by gel permeation chromatography (GPC), of from 300 to 15000 daltons. Typically the Mn of the polyesters is at least 350 daltons, preferably at least 400 daltons, more in particular at least 550 daltons. The Mn typically varies according to the type and nature of coating wherein the polyester is used, and typically is measured via GPC using polystyrene standards.

It was surprisingly found that the incorporation of a dianhydrohexitol in a terephthalic acid and/or isophthalic acid group containing polyester is possible in a short time frame at moderate temperatures.

That glycolysis is fast in the process of the invention could be demonstrated by 31P-NMR on the phosphorous based derivatized resin using the method of Chan, K. P. et al (1994) in Macromolecules, 27, 6371-6375, or the method of Spyros, A. et al. (1997) in Macromolecules, 30, 327-329.

This was not expected in view of the poor reactivity of dianhydrohexitol and the high reaction temperatures needed in a direct condensation process using said dianhydrohexitol. Preferably glycolysis with a dianhydrohexitol, and optionally one or more other polyols (e.g. glycerol and/or sorbitol), is performed at a temperature and for a time sufficient to obtain transesterification. By "other" is meant a polyol different from the dianhydrohexitol.

In the process of the invention, step (1) advantageously is performed under temperature conditions of from 200° C. to 260° C. Preferably the temperature throughout step (1) is below 250° C. More preferably step (1) is performed under temperature conditions of from 220° C. to 240° C.

Step (1) in the process of the invention preferably proceeds in the presence of a transesterification catalyst. Possible transesterification catalysts include n-butyltin trioctoate and/or tetra-n-butyltitanate.

In some cases, hydroxyl-functional polymers of the desired molecular weight can be obtained after step (1) of the process of the invention.

In most cases however, step (1) will be followed by one or more additional steps, more in particular one or more additional reaction steps. Such additional steps advantageously lead to polyesters with the desired properties, such as the desired molecular weight, the desired degree of condensation etc. The additional steps may comprise steps of vacuum, chain extension, carboxylation and/or other suitable steps.

In a preferred embodiment of the invention, step (1) in the process is followed by a step (2) comprising a step of chain extension and/or carboxylation.

In the process of the invention, chain extension may be obtained by applying a reduced pressure (<1 atm) or vacuum (e.g. 50 mm Hg) and/or by reacting a hydroxyl-functional prepolymer previously obtained (in step 1) with one or more polyacids, preferably one or more linear chain dicarboxylic acids and, optionally, one or more other polyacids.

A reduced pressure or vacuum may be used to distill of ethylene glycol until the desired hydroxyl number is obtained. Alternatively, a reduced pressure or vacuum may be applied to distill of part of the ethylene glycol, followed by a condensation reaction with one or more polyacids, preferably one or more linear chain dicarboxylic acids and, optionally, one or more other polyacids.

Depending on whether or not (part of the) ethylene glycol is first distilled of or not, the final weight ratio of dianhydrohexitol to linear chain dicarboxylic acids (e.g. isosorbide to succinic acid) will change.

Ideally the final weight ratio of dianhydrohexitol to linear dicarboxylic acid (e.g. isosorbide to succinic acid) is from 0.3 to 2.5, typically from 0.5 to 2, and preferably from 0.7 to 1.4. Tg values as known may vary and be adapted to the end use.

If high Tg values are aimed for, it is better to apply vacuum first to reduce the hydroxyl number of the hydroxyl-functional prepolymer obtained in step (1) of the process of the invention. This can be particularly advantageous when the hydroxyl-functional or carboxyl-functional polyesters of the invention, in a further reaction step, are converted in a (meth) acryloyl-functional polyester.

In the process of the invention, carboxylation e.g. is obtained by reacting a hydroxyl-functional prepolymer previously obtained (in step 1, possibly followed by a step of reduced pressure or vacuum) with one or more polyacids. Preferred are linear chain dicarboxylic acids, which may be used alone or in combination with one or more other polyacids.

In a preferred process of the invention, one or more polyacids are used for said chain extension and/or said carboxylation. Preferred polyacids for use in said chain extension and/or said carboxylation step are linear chain dicarboxylic acids. Said linear chain dicarboxylic acids may be used alone or in combination with one or more other polyacids. By "other" is meant in this context different from the linear chain dicarboxylic acid(s) used (e.g. succinic acid). Preferably at least one, and more preferably all, of the polyacids used for said chain extension and/or said carboxylation in step (2) are renewable polyacids.

In an embodiment of the invention, the step of chain extension and/or carboxylation in the process of the invention is followed by a step of reduced pressure (<1 atm) or vacuum (e.g. 50 mm Hg). Advantageously, a reduced pressure or vacuum is applied until the desired degree of condensation is obtained.

Preferably step (2), and more in particular the step of chain extension and/or carboxylation therein, is performed under temperature conditions of from 120° C. to 260° C., in particular from 200° C. to 260° C. More preferably step (2), and more in particular the step of chain extension and/or carboxylation therein, is performed at temperatures below 250° C., more in particular at temperatures between 220° C. and 240° C.

Anhydride end-capping can also be done in step 2. For this kind of reaction, the reaction temperature in step 2 typically is between 120° C. and 240° C., preferably between 160° C. and 200° C.

The polyethylene terephthalate and/or polyethylene isophthalate used as starting material in the process of the invention may be provided under the form of a material (or reactant) comprising said polyethylene terephthalate and/or said polyethylene isophthaltate. The material advantageously is a recycled material.

Particularly suited are materials that comprise polyethylene terephthalate, more in particular recycled polyethylene terephthalate.

Preferably the material comprising recycled polyethylene terephthalate is recycled polyethylene terephthalate, more in particular PET scrap.

Of course non-recycled PET (or virgin PET) can also be used instead of the recycled PET. The use of a polyethylene isophthalate as reactant in step (1) of the process of the invention is particularly advantageous to improve outdoor durability.

In an embodiment of the invention, a polyethylene isophthalate first is prepared through the direct condensation of ethylene glycol and isophthalic acid and/or dimethylisophthalate. Such a polyethylene isophthalate is then subjected to a step of glycolysis as described in step (1) of the process of the invention. The polyethylene isophthalate can be prepared in the same or in another reactor. Alternatively recycled polyethylene isophthalate can be used.

Preferably the polyethylene terephthalate and/or the polyethylene isophthalate is the sole source of ethylene glycol and of terephthalic acid and/or isophthalic acid incorporated into the polyesters of the invention.

The present invention also relates to polyesters obtainable by (or obtained by) the process of the invention.

In particular there is provided a hydroxyl-functional or carboxyl-functional polyester comprising moieties of
 (a) terephthalic acid and/or isophthalic acid,
 (b) ethylene glycol,
 (c) a dianhydrohexitol, and
 (d) one or more linear chain dicarboxylic acids.

The hydroxyl-functional or carboxyl-functional polyesters of the invention may further, optionally, comprise moieties (e) of one or more other polyols (e1) and/or of one or more other polyacids (e2).

By other polyols (e1) is meant a polyol different from said dianhydrohexitol. Preferably the polyol is also different from ethylene glycol. Advantageously, the other polyol (e1) is different from moieties (b) and (c).

By other polyacids (e2) is meant a polyacid different from the linear chain dicarboxylic acids (d). Preferably the polyacid is also different from terephthalic acid and/or isophthalic acid. Advantageously, the other polyacid (e2) is different from moieties (a) and (d). Advantageously the other polyacid (e2) is not a fatty acid, in particular is not a saturated or an unsaturated dimer or trimer fatty acid.

Advantageously the linear chain dicarboxylic acid (d) is not a fatty acid, in particular is not a saturated or an unsaturated dimer fatty acid.

In an embodiment of the invention, the linear chain dicarboxylic acids (d) and the other polyacids (e2) that are used in the preparation of hydroxyl-functional polyesters, and in particular in the preparation of carboxyl-functional polyesters of the invention, are different from a fatty acid, more in particular are different from a saturated or an unsaturated dimer or trimer fatty acid.

Advantageously hydroxyl-functional or carboxyl-functional polyesters of the invention, and in particular carboxyl-functional polyesters of the invention, comprise, based on the total weight of the polyester, less than 20% by weight, typically less than 5% by weight, preferably less than 1% by weight, more preferably less than 0.1% by weight of fatty acid moieties. Advantageously hydroxyl-functional or carboxyl-functional polyesters of the invention, and in particular carboxyl-functional polyesters of the invention, comprise no fatty acid moieties, in particular comprise no saturated or unsaturated dimer or trimer fatty acid moieties, more in particular comprise no saturated dimer fatty acid moieties.

In an embodiment according to the present invention, the weight percentages of the moieties (a), (b), (c), (d) and of the optional moieties (e1) and/or (e2) sum up to 100%. Hydroxyl-functional or carboxyl-functional polyesters of the invention advantageously have a number average molecular weight, as measured by gel permeation chromatography (GPC), of from 300 to 15000 daltons, preferably from 350 to 15000 daltons, in particular from 500 to 15000 daltons.

Typically the Mn of the polyesters is at least 400 daltons. Preferably the Mn is at least 550 daltons, more preferably at least 750 daltons, most preferably at least 1100 daltons. Preferably the Mn is at most 11000 daltons, more preferably at most 8500 daltons, depending on the type of coating wherein the polyester is used. Typically the Mn is measured by GPC using polystyrene standards.

Typically the Mn is measured by GPC in THF (tetrahydrofuran) on a 3×PLgel 5 μm Mixed-D LS 300×7.5 mm column MW range 162 to 377400 g/mol calibrated with polystyrene standards, at 40° C. Typically Refractive Index (RI) is used as detector.

Hydroxyl-functional or carboxyl-functional polyesters of the invention preferably are prepared from, based on the total weight of the polyester, 5% to 35% by weight of moieties of ethylene glycol (b). The amount of ethylene glycol moieties in the polyester preferably is at least 10% by weight, typically at least 12% by weight, often at least 15% by weight. Typically the amount of ethylene glycol moieties in the polyester does not exceed 30% by weight.

Preferred hydroxyl-functional or carboxyl-functional polyesters of the invention comprise, based on the total weight of the polyester:
(a) from 10% to 80% by weight of moieties of terephthalic acid and/or of isophthalic acid,
(b) from 5% to 35% by weight of moieties of ethylene glycol,
(c) from 5% to 40% by weight of moieties of dianhydrohexitol,
(d) from 5% to 40% by weight of moieties of one or more linear chain dicarboxylic acids, and
(e) optionally, from 0% to 40% by weight of moieties of one or more other polyols (e1) and/or of one or more other polyacids (e2).

Preferably the hydroxyl-functional or carboxyl-functional polyesters of the invention comprise at least 30% by weight and preferably at most 60% by weight of terephthalic acid moieties and/or of isophthalic acid moieties.

Preferably the hydroxyl-functional or carboxyl-functional polyesters of the invention comprise at least 10% by weight, typically at least 12% by weight, often at least 15% by weight, and preferably at most 30% by weight of ethyelene glycol moieties.

Preferably the hydroxyl-functional or carboxyl-functional polyesters of the invention comprise at least 10% by weight and preferably at most 30% by weight of dianhydrohexitol moieties.

Preferably the hydroxyl-functional or carboxyl-functional polyesters of the invention comprise at least 10% by weight of linear dicarboxylic acid moieties and preferably at most 30% by weight of linear dicarboxylic acid moieties.

Preferably the hydroxyl-functional or carboxyl-functional polyesters of the invention, optionally, comprise from 0 to 35% by weight, generally from 0 to 20% by weight of one or more other polyol moieties and/or one or more other polyacid moieties.

Weight percentages are herein on the total weight of the polyester. In an embodiment according to the present invention, the weight percentages of the moieties (a) through (e) as identified above sum up to 100%.

Generally the hydroxyl-functional or carboxyl-functional polyesters of the invention are derived from materials based on a polyethylene terephthalate and/or a polyethylene isophthalate that is glycolysed in the presence of a dianhydrohexitol and further reacted with one or more linear chain dicarboxylic acids.

In general less than 10% by weight of the terephthalic acid and/or isophthalic acid moieties (a) present in the polyesters of the invention are derived from a di-alkyl terephthalate and/or di-alkylisophthalate. Preferably this percentage is below 5% by weight.

Weight percentages are herein on the total weight of the polyester.

The term "dianhydrohexitol" (c), used in the synthesis of the hydroxyl-functional or carboxyl-functional polyesters of the present invention, refers to any of the three isomers of a dianhydrohexitol, i.e. isosorbide, isoide and/or isomannide. The three isomers may be used alone or as a mixture of two or three of the isomers.

Preferably the dianhydrohexitol (c) comprises at least isosorbide, optionally in combination with at least one of isoide and isomannide. Most preferably the dianhydrohexitol (c) is isosorbide. The dianhydrohextiol, preferably isosorbide, may be a renewable polyol.

The linear chain dicarboxylic acids (d), used in the synthesis of the hydroxyl-functional or carboxyl-functional polyesters of the present invention preferably are linear chain aliphatic dicarboxylic acids that advantageously are selected from succinic acid, adipic acid, glutaric acid, pimelic acid, suberic acid, azelaic acid, sebacic acid, 1,12-dodecanedioic acid, and possibly from dimer diacids such as Empol® 1018 or Pripol® 1013. Preferred is succinic acid, in particular succinic acid obtained from renewable resources. Also preferred is adipic acid, in particular adipic acid obtained from renewable resources. Preferred are also dimer diacids, in particular dimer diacids obtained from renewable resources.

In an embodiment according to the present invention, the linear chain dicarboxylic acid (d) that is used in the synthesis of the polyesters of the invention, more in particular in the synthesis of the carboxyl-functional polyesters of the present invention, is not a fatty acid, or is not derived from a fatty acid, more in particular is not a saturated or an unsaturated dimer fatty acid.

The other polyols (e1), used in the synthesis of the hydroxyl-functional or carboxyl-functional polyesters of the present invention, are preferably selected from neopentyl glycol, diethylene glycol, propyleneglycol, 1,3-propanediol, 1,4-butanediol, 2,3-butanediol, 1,6-hexanediol, 1,4-cyclohexanediol, 1,4-cyclohexanedimethanol, 2-methyl-1,3-propanediol, 2-ethyl, 2-butyl-1,3-propanediol, 1-ethyl-2-methyl-1,3-propanediol, 2-ethyl-2-methyl-1,3-propanediol, hydrogenated Bisphenol A, hydroxypivalate of neopentyl glycol, glycerol, sorbitol, trimethylolpropane, ditrimethylolpropane, pentaerythrytol, and from dimer diols, such as SPEZIOL® 1075. Preferred are sorbitol and/or glycerol and/or 1,3-propanediol, more in particular sorbitol and glycerol. Particularly suited is glycerol. Preferred are also dimer diols, in particular dimer diols obtained from renewable resources. Also preferred is diethylene glycol.

The other polyacids (e2), used in the synthesis of the hydroxyl-functional or carboxyl-functional polyesters of the present invention, are preferably selected from fumaric acid, maleic acid, itaconic acid, citraconic acid, mesaconic acid, phthalic anhydride, 1,4-cyclohexanedicarboxylic acid, 1,3-cyclohexanedicarboxylic acid, 1,2-cyclohexanedicarboxylic acid, citric acid, tartaric acid, trimellitic acid, pyromellitic acid, or the corresponding anhydrides (of any of these). Preferred hydroxyl-functional or carboxyl-functional polyesters of the invention have an acid number or a hydroxyl number of from 10 to 310 mg KOH/g. Preferably the acid number or the hydroxyl number is at least 15 mg KOH/g, more preferably at least 20 mg KOH/g. Preferably the acid number or the hydroxyl number is at most 200 mg KOH/g, often at most 150 mg KOH/g, more preferably at most 100 mg KOH/g, though this may depend on the nature of the coating wherein they are used.

Preferred hydroxyl-functional or carboxyl-functional polyesters of the invention are characterized by a glass transition temperature (Tg), measured by Differential Scanning calorimetry according to ASTM D3418 with a heating gradient of 20° C. per minute, of less than 120° C., more preferably less than 100° C. and most preferably less than 80° C. Preferably the Tg is at least 40° C., more preferably at least 45° C., most preferably at least 50° C. if the polyester is to be used in a powder coating. In liquid coating compositions typically polyesters are used with a Tg of at least −100° C., preferably at least −50° C., more preferably at least −20° C.

Preferred hydroxyl-functional or carboxyl-functional polyesters of the invention have a Brookfield (cone/plate) viscosity accordingly to ASTM D4287-88, of from 50 mPa·s at room temperature (e.g. 25° C.) to 15000 mPa·s at 200° C. Preferably the Brookfield (cone/plate) viscosity at room temperature (e.g. 25° C.) is at least 500 mPa·s, more preferably at least 700 mPa·s. Preferably the Brookfield (cone/plate) viscosity at 200° C. is at most 12000 mPa·s, more preferably at most 10000 mPa·s.

Preferably the hydroxyl-functional and/or carboxyl-functional polyesters of the invention are amorphous polyesters.

Below some most preferred ways of producing hydroxyl-functional or carboxyl-functional polyesters of the invention:

Hydroxyl-functional or carboxyl-functional polyesters of the invention are preferably obtained from the transesterification (also referred to as glycolysis) of recycled polyethylene terephthalate with dianhydrohexitol, preferably isosorbide, and, optionally, one or more other polyols, such as glycerol and/or sorbitol. Another example of such other polyol is 1,3-propanediol.

To the hydroxyl functional prepolymer thus obtained, a linear chain dicarboxylic acid, preferably succinic acid, and, optionally, one or more other polyacids is added. The polycondensation is continued, first under atmospheric pressure, then under reduced pressure until the right polyester characteristics are obtained.

When starting from (recycled) polyethylene terephthalate, the dianhydrohexitol together with another polyol, preferably glycerol, is brought in a conventional reactor equipped with a stirrer, an inert gas (e.g. nitrogen) inlet, a thermocouple, a distillation column connected to a water-cooled condenser, a water separator and a vacuum connection tube and heated to 160° C. Preferably a transesterification catalyst, such as n-butyltin trioctoate or tetra-n-butyltitanate is present as well.

Once at 160° C., the (recycled) polyethylene terephthalate is gradually added under stirring meanwhile the temperature is increased to 230° C. Once at 230° C. and the complete reactor content turned into the liquid phase, stirring is continued, under nitrogen atmosphere, for another 3 hours. If needed, in order to reduce the ethylene glycol content in the hydroxyl functional prepolymer, a vacuum step here can be applied until the assumed hydroxyl number is obtained. Then the reactor content is cooled down to a temperature of from 160° C. to 200° C. and the linear chain diacarboxylic acid, preferably succinic acid is added, optionally along with one or more other polyacids. A condensation catalyst, such as n-butyltin trioctoate may be added. The reactor content is heated again to 230° C. The reactor content then is stirred for another two hours at 230° C. under N₂ (nitrogen) atmosphere at atmospheric pressure. Vacuum then is applied and the degree of esterification followed by determining the amount of water formed in the course of the reaction and the properties of the obtained polyester, for example the hydroxyl number, the acid number, the molecular weight or the viscosity.

During or at the end of the polyesterification, optionally, colour stabilisers, for example, phenolic antioxidants such as IRGANOX® 1010 (Ciba) or phosphonite- and phosphite-type stabilisers such as tributylphosphite, can be added in an amount from 0 to 1% by weight of the reactants. To the (thermosetting) hydroxyl-functional or carboxyl-functional polyesters of the invention, while still in the molten state, optionally crosslinking catalysts can be added. These optional catalysts are added in order to accelerate crosslinking of the thermosetting composition during curing. Examples of such catalysts include amines (e.g. 2-phenylimidazoline), phosphines (e.g. triphenylphosphine), ammonium salts (e.g. tetrabutylammonium bromide or tetrapropylammonium chloride), phosphonium salts (e.g. ethyltriphenylphosphonium bromide, tetrapropylphosphonium chloride), tin catalysts (e.g. dibutyltin dilaurate), bismuth catalysts (e.g. bismuth neodecanoate) or zinc catalysts (e.g. zinc octoate) amongst others. Otherwise blocked or latent catalysts, such as these described in for example U.S. Pat. No. 5,134,239 or WO 0137991, or encapsulated catalysts such as these described in for example U.S. Pat. No. 6,274,673 or EP 1,348,742 can be introduced. These catalysts are preferably used in an amount of 0 to 5% with respect of the weight of the polyesters.

The dianhydrohexitol, the linear chain dicarboxylic acid, the other polyacids and/or the other polyols used in the preparation process of the invention (any of the above embodiments) can be obtained from renewable resources.

In an embodiment of the present invention, the polyesters of the invention are prepared from reactants comprising (or including) recycled polyethylene terephthalate and/or recycled polyethylene isophthalate, and from one or more polyols and/or polyacids, wherein at least one of the polyols and/or polyacids is obtained from renewable resources. Preferably all polyols and/or polyacids used are obtained from renewable resources.

In a specific embodiment of the present invention, the polyesters of the invention are prepared from reactants comprising (or including) recycled polyethylene terephthalate and from one or more polyols and/or polyacids, wherein at least one of the polyols and/or polyacids is obtained from renewable resources. Preferably all polyols and/or polyacids used are obtained from renewable resources.

The polyols and/or polyacids obtained from renewable resources are preferably obtained from bio-based feedstocks such as vegetable oils, starch, cellulose/pulp, sugar, natural fibers and/or other vegetable raw materials.

The hydroxyl-functional and/or carboxyl-functional polyesters of the invention can be used in a thermosetting coating composition and/or in a radiation curable coating composition. The thermosetting coating composition may be a powder coating composition or a liquid coating composition. The liquid coating composition according to the invention may be water-borne or solvent-borne. An aspect of the invention concerns such coating compositions.

Preferred thermosetting coating compositions of the invention comprise at least one hydroxyl-functional and/or at least one carboxyl-functional polyester of the invention, along with a crosslinker having functional groups reactable with the polyesters' functional groups. Depending on the type of hardener used, the presence of an acid catalyst may be desired.

Upon application and curing at temperatures between room temperature (e.g. 25° C.) and 200° C., the thermosetting coating compositions of the invention advantageously result in coatings exhibiting excellent flow and outstanding flexibility. For powder coatings curing temperatures are often between 100° C. and 200° C.

In liquid coating compositions typically polyester polyols are used. When solvent borne coating compositions are considered, the polyester solutions used are preferably characterized by a mass fraction of solids of at least 60%, advantageously of at least 70%, more preferably of at least 75% (determined according to DIN EN ISO 3251). Preferable the mass fraction of solids does not exceed 99%.

The polyester solutions are preferably characterized by a dynamic viscosity (according to DIN EN ISO 3219 at 23° C.) of from 50 to 35000 mPa·s. Preferably the viscosity is at least 500 mPa·s, more preferably at least 1000 mPa·s, most preferably at least 1500 mPa·s. Preferably the viscosity is at most 30000 mPa·s, more preferably at most 25000 mPa·s, most preferably at most 20000 mPa·s.

Preferably the polyesters used therein have a hydroxyl (OH) number on the solid resin (according to DIN EN ISO 4629) of between 10 and 310 mg KOH/g, more preferably of between 10 and 300 mg KOH/g. Preferably the OH number is at least 50 mg KOH/g, more preferably at least 80 mg KOH/g, most preferably at least 100 mg KOH/g. Preferably the OH number is at most 250 mg KOH/g.

Polyester polyols used in liquid coating compositions typically are low molar mass polyester polyols. The low molar mass polyester polyols used may be chemically or physically modified by reaction, for example, with isocyanate compounds or compounds which comprise oxirane groups. Other possible modifications include the incorporation of low molar mass urea derivatives. The polyester polyols may also be the basis of (grafted-on) acrylate polymers, such as described in U.S. Pat. No. 6,258,897, EP 0776920 and EP 0896991, the content of which is incorporated herein by reference.

In the liquid coating composition, the polyester according to the present invention partially can be replaced by an acrylic resin.

The liquid coating composition thus comprises at least one acrylic resin and at least one polyester resin in a ratio of polyester resin:acrylic resin of between 4:1 and 2:1, preferably between 3.5:1 and 2.5:1, more preferably between 3.2:1 and 2.2:1, most preferably between 3:1 and 2.2:1.

Preferably the liquid coating composition used in the process according to the invention further comprises at least one hardener. Suitable hardeners are well known in the art.

Possible hardeners (or cross-linkers) include (blocked or non-blocked) polyisocyanates, amino resins, phenolic resins, polycarboxylic acids and their anhydrides (see e.g. U.S. Pat. No. 6,258,897). Polyisocyanates in non-blocked form may be used for curing at moderate temperatures or at room temperature. For curing at elevated temperature, blocked polyisocyanates and also polycarboxylic acids and their anhydrides are additionally suitable.

Amino resins are preferred hardeners (or curing agents), more in particular urea resins, melamine resins and/or benzoguanamine resins. These are etherified urea-, melamine- or benzo-guanamine-formaldehyde condensation products, respectively. Particularly preferred are melamine resins and especially high solids methylated melamine resins such as hexamethoxymethylmelamine resins.

"High solids" in this context refers to a mass fraction of solids of at least 70%, in particular at least 75%, preferably at least 95%. Suitable hardeners are e.g. hexamethoxymethylmelamine resins with a mass fraction of solids above 98%. Other preferred examples include high imino resins with a mass fraction of solids in the range of 78% to 82%.

Preferably an acid catalyst is added when amino resins are used as hardener. In an embodiment of the invention the liquid coating composition used further comprises an acid catalyst.

Fully alkylated amino resins often require a strong acid catalyst such as CYCAT® 4045, whereas partially alkylated and high imino resins in general only need a weak acid catalyst. Also urea and glycoluril resins respond better to a strong acid catalyst.

Examples of possible catalysts include amine blocked p-toluene sulfonic acid (pTSA), dimethyl pyrophosphate (DMAPP), dodecylbenzenesulfonic acid (DDBSA) and dinonylnaphthalenedisulfonic acid (DNNDSA). Preferred catalysts are amine blocked p-toluene sulfonic acids like ADDITOL® VXK 6395 and CYCAT® 4045.

Preferably the mass fraction of the resin(s) in the liquid coating composition is between 10% and 90%. Preferably the mass fraction of the resins is at least 20%, more preferably at least 50%. Preferably the mass fraction of the resins is at most 85%, more preferably at most 80%. Preferably the mass fraction of the hardener in the liquid coating composition is between 5% and 70%. Preferably the mass fraction of the hardener is at least 10%, more preferably at least 12%. Preferably the mass fraction of the hardener is at most 40%, more preferably at most 25%.

The ratio of the mass fractions of the resin(s) and the hardener(s) preferably is between 6:1 and 1:1, more in particular between 5:1 and 2:1.

Preferably the mass fraction of the optional acid catalyst in the liquid coating composition is between 0% and 10%, more in particular between 0.1% and 10%. Preferably the mass fraction of the optional catalyst is at least 0.3%. Preferably the mass fraction of the optional catalyst does not exceed 8%.

Examples of suitable solvents for the resins and in particular the preferred oligoester polyols and/or acrylic resins of the invention include aliphatic, cycloaliphatic and aromatic hydrocarbons, such as alkylbenzenes, e.g., xylene, toluene; esters, such as ethyl acetate, butyl acetate, acetates with longer alcohol residues, butyl propionate, pentyl propionate, ethylene glycol monoethyl ether acetate, the corresponding methyl ether acetate, and propylene glycol methyl ether acetate; ethers, such as ethylene glycol monoethyl, monomethyl or monobutyl ether; glycols; alcohols; ketones such as methyl isoamyl ketone and methyl isobutyl ketone; lactones, and mixtures of such solvents. Further solvents which can be used include reaction products of lactones with glycols or alcohols. Particularly preferred are mixtures of a dimethylester (like DME-1, a santosol dimethylester of adipic, glutaric & succinic acid) and S-100 (an aromatic hydrocarbon solvent from HuaLun Chemistries). Butanol may help stabilize paint storage.

The mass fraction of the optional solvents in the liquid coating composition typically is between 0% and 50%. Preferably the mass fraction of the optional solvents is at least 5%, more preferably at least 10%. Preferably the mass fraction of the optional solvents is at most 40%, more preferably at most 30%.

The liquid coating composition of the invention may further comprise pigments and/or colorants and/or fillers. Examples of fillers include talc, mica, kaolin, chalk, quartz flour, slate flour, various silicas, silicates, etc. The mass fraction of the optional pigments and/or colorants and/or fillers in the liquid coating composition preferably is between 0% and 50%, more preferably between 2 and 40%.

The liquid coating composition resin can be applied to the substrate by any coating process suitable thereto. Examples thereof are brushing, dipping, flow coating, roller coating or blade coating, but especially by spraying.

After the coating of the substrate with the liquid coating composition, the latter is cured. Curing, i.e. crosslinking can be achieved by any suitable means well known to those skilled in the art. For the purpose of the invention, the liquid coating materials are generally cured within a temperature range from 20° C. to 160° C., preferably from 23° C. to 140° C. in for example from five minutes to ten days, more in particular from 15 minutes to 120 minutes.

In an embodiment of the invention the process of the invention described supra further comprises a step of converting a hydroxyl-functional polyester or a carboxyl-functional polyester as described above into a (meth)acryloyl-functional polyester, more in particular (meth)acryloyl group end-capped polyesters. In the present invention, the term "(meth) acryloyl' is to be understood as to encompass both acryloyl and methacryloyl compounds or derivatives as well as mixtures thereof. The present invention further concerns polyesters obtained by (or obtainable by) such process of the invention.

An aspect of the invention concerns such (meth)acryloyl-functional polyesters obtained or prepared from a hydroxyl-functional or a carboxyl-functional polyester of the invention. In an embodiment according to the present invention, the hydroxyl-functional polyesters and in particular the carboxyl-functional polyesters from which the (meth)acryloyl-functional polyesters of the invention are prepared comprise, based on the total weight of the polyester, less than 20% by weight, typically less than 5% by weight, preferably less than 1% by weight, more preferably less than 0.1% by weight of fatty acid moieties. Advantageously the hydroxyl-functional and in particular the carboxyl-functional polyesters from which the (meth)acryloyl-functional polyesters of the invention are prepared comprise no fatty acid moieties, in particular comprise no saturated or unsaturated dimer or trimer fatty acid moieties, more in particular comprise no saturated dimer fatty acid moieties.

(Meth)acryloyl-functional polyesters of the invention, more in particular (meth)acryloyl group end-capped polyesters of the invention, are particularly useful in radiation curable and/or in heat curable coating compositions, optionally in combination with one or more ethylenically unsaturated cohardeners.

The conversion of the carboxyl- and hydroxyl-functional polyesters of the present invention into (meth)acryloyl group end-capped polyesters may be realized through the reaction of a diisocyanate with a hydroxyalkyl(meth)acrylate and the terminal hydroxyl groups of a polyester; or from the reaction of glycidyl(meth)acrylate and the terminal carboxyl groups of a polyester. Alternatively, a (meth)acryloyl group end-capped polyester may be obtained from the reaction of a (meth)acrylic acid and the terminal hydroxyl groups of a polyester.

The hydroxyalkyl(meth)acrylate used for reaction with the diisocyanate in the above reaction is preferably selected from hydroxyethyl(meth)acrylate, 2- or 3-hydroxypropyl(meth) acrylate, 2-, 3- and 4-hydroxybutyl(meth)acrylate.

The diisocyanate used for the reaction with the hydroxyalkyl(meth)acrylate and the hydroxyl group containing polyester in the above reaction is preferably selected from 1-isocyanato-3,3,5-trimethyl-5-isocyanatomethyl-cyclohexane (isophorondiisocyanate, IPDI), tetramethyl-xylenediisocyanate (TMXDI), hexamethylenediisocyanate (HDI), trimethylhexamethylenedi-isocyanate, 4,4'-diisocyanatodicyclohexylmethane, 4,4'-diisocyanatodiphenylmethane, the technical mixtures with 2,4-diisocyanatodiphenylmethane and also the higher homologues of above mentioned diisocyanates, 2,4-diisocyanato-toluene and technical mixtures of them with 2,6-diisocyanatotoluene, as well as the copolymerisation product of α,α'-dimethyl-meta-isopropenylbenzylisocyanate (TMI).

The conversion of the hydroxyl- or carboxyl-functional polyester into a (meth)acryloyl functional polyester, can be done in a bulk process or in solvent, such as toluene, in the presence of any of the known catalysts, such as p-toluene sulfonic acid.

Particularly preferred ways to produce (meth)acryloyl-functional polyesters of the invention are described below:

On completion of the earlier described polycondensation, the hydroxyl-functitonal or carboxyl-functional polyester of the invention in the molten state, which is found in the reactor, is allowed to cool to a temperature between 100° C. and 160° C., and a radical polymerisation inhibitor, such as phenothiazine or an inhibitor of the hydroquinone type, is added in a proportion of e.g. 0.01 to 1% with respect to the weight of the polyester and the nitrogen is replaced by an oxygen inlet.

When starting from a hydroxyl-functional polyester of the invention, a substantially equivalent amount of hydroxyalkyl (meth)acrylate is added thereto. When all the hydroxyalkyl (meth)acrylate is added, an equivalent amount of diisocyanate is slowly added to the mixture. A catalyst for the hydroxyl/ isocyanate reaction can optionally be used. Examples of such catalysts include these listed above for accelerating the crosslinking reaction. These catalysts are preferably used in an amount of 0 to 1% with respect to the weight of the polyester.

Alternatively, to the hydroxyl-functional polyester of the invention, a substantially equivalent amount of (meth)acrylic acid is added. The reaction preferably is done in 10% to 50% by weight of solvent such as toluene, cyclohexane and/or heptane, at a temperature of from about 80° C. to about 120° C. in the presence of from 0.1% to 5% by weight of a catalyst such as suphonic acid or sulfuric acid, which can be rinsed out after completion of the reaction. Otherwise, when starting from a carboxyl-functional polyester of the invention, a substantially equivalent amount of glycidyl(meth)acrylate is added thereto. A catalyst for the acid/epoxy reaction can optionally be used. Examples of such catalysts include these mentioned above for accelerating the crosslinking reaction. These catalysts are preferably used in an amount of 0.05 to 1% with respect to the weight of the polyester.

The degree of progression of the reaction typically is monitored by determination of the properties of the polyester obtained, for example the hydroxyl number, the acid number, the degree of unsaturation and/or the content of free glycidyl (meth)acrylate or hydroxyalkyl(meth)acrylate.

(Meth)acryloyl-functional polyesters of the invention thus obtained, are preferably characterized by a degree of unsaturation of from 0.15 to 5.00, usually from 0.15 to 4.00, milliequivalents of double bonds per gram of polyester. Preferably the degree of unsaturation ranges from 0.35 to 3.00, more in particular from 0.35 to 2.50 milliequivalents of double bonds per gram of polyester. Preferably the degree of telechelic unsaturation of the (meth)acryloyl functional polyesters of the invention ranges of from 0 to 5.0, typically from 0 to 2.5, more preferably from 0 to 2 milliequivalents of double bonds per gram of polyester.

Preferred (meth)acryloyl functional polyesters for use in powder coatings have a number average molecular weight (Mn), measured by gel permeation chromatography (GPC), of at least 400 daltons, typically at least 550 daltons, preferably of at least 850 daltons, more preferably of at least 1200 daltons.

Preferred (meth)acryloyl functional polyesters for use in radiation curable coating compositions have a number average molecular weight (Mn), measured by gel permeation chromatography (GPC), of at least 350 daltons, typically at least 400 daltons, preferably of at least 550 daltons, more preferably of at least 750 daltons.

Yet another aspect of the invention concerns a coating composition comprising at least one (meth)acryloyl-functional polyester of the invention, and, preferably, further comprising at least one ethylenically unsaturated oligomer and/or monomer. The ethylenically unsaturated oligomer preferably is a polyfunctional (meth)acrylate oligomer. By polyfunctional is meant to designate an oligomer having at least two unsaturated groups selected from acrylate and/or methacrylate groups.

The coating composition may be a radiation curable coating composition or, alternatively, a thermosetting coating composition.

Various types of coating compositions can thus be prepared with a polyester according to the invention. The coating composition can be any type of thermosetting and/or radiation curable composition comprising at least one at least one hydroxyl-functional polyester, carboxyl-functional polyester and/or a (meth)acryloyl-functional polyester as described above. A thermosetting coating composition, more in particular a thermosetting powder coating composition, is just one particular example.

Advantageously the hydroxyl-functional or carboxyl-functional polyesters, and in particular the carboxyl-functional polyesters, present in a thermosetting powder coating composition according to the invention comprise, based on the total weight of the polyester, less than 20% by weight, typically less than 5% by weight, preferably less than 1% by weight, more preferably less than 0.1% by weight of fatty acid moieties.

Advantageously the hydroxyl-functional or carboxyl-functional polyesters, and in particular the carboxyl-functional polyesters, that are used in a powder coating composition according to the invention comprise no fatty acid moieties, in particular comprise no saturated or unsaturated dimer or trimer fatty acid moieties, more in particular comprise no saturated dimer fatty acid moieties.

Thermosetting powder coating compositions of the present invention advantageously comprise substantially no semi-crystalline polyesters. Typically thermosetting powder coating compositions of the present invention comprise less than 10% by weight, in general less than 5% by weight of semi-crystalline polyesters. Advantageously thermosetting powder coating compositions of the present invention comprise no semi-crystalline polyesters.

Also provided in the present invention is a polyester resin comprising at least one polyester of the invention. Again the polyester may be any of the polyesters described above, id est a hydroxyl-functional polyester, a carboxyl-functional polyester and/or a (meth)acryloyl-functional polyester as described above.

In a particular embodiment of the present invention, the hydroxyl-functional, carboxyl-functional and/or (meth)acryloyl-functional polyester resins of the present invention optionally comprise from 0 to 10% by weight of an acrylic copolymer such as claimed in WO 2009/095460. Preferably this acrylic copolymer is added in amount of at least 0.5% by weight, more preferably at least 1% by weight based on the polyesters. Preferably this acrylic copolymer is added in amount of at most 5% by weight, more preferably at most 3% by weight based on the polyesters.

The acrylic copolymer typically is added to the polyesters of the invention, while in the molten stage, during its synthesis or at the end of its synthesis, preceding or during discharging. Thermosetting coating compositions and in particular thermosetting powder coating compositions are just one aspect of the invention.

When used in thermosetting coating compositions, the polyester of the present invention, is advantageously formulated with at least one crosslinker thus constituting the binder of the coating formulation. When radiation curable, optionally, one or more cohardeners can be present in the (thermosetting) coating composition such as ethylenically unsaturated monomers and/or oligomers as further described.

An embodiment of the invention concerns a thermosetting coating composition comprising at least one polyester of the present invention and further comprising at least one crosslinker capable of reacting with the polyesters' functional groups. More in particular, the thermosetting coating composition comprises at least one hydroxyl-functional polyester of the invention and/or at least one carboxyl-functional polyester of the invention and/or at least one (meth)acryloyl-functional polyester of the invention.

The crosslinkers that can be combined with the polyesters of the present invention are preferably selected from polyepoxy compounds, β-hydroxyalkylamide containing compounds, or polyisocyanate compounds and their mixtures.

Preferred polyepoxy compounds are solid at room temperature and contain at least two epoxy groups per molecule. Triglycidyl isocyanurates, such as the one marketed under the name Araldite®PT810, blends of diglycidyl terephthalate and triglycidyl trimellitates, such as those commercialized under the name of Araldite®PT910 and Araldite®PT912, and bisphenol A based epoxy resins such as those commercialized under the names Araldite® GT 7004 or DER® 692, are especially preferred.

Acrylic copolymers containing glycidyl groups obtained from glycidyl (meth)acrylate, at least one alkyl(meth)acrylic monomer and optionally one or more ethylenically monounsaturated monomers different from the alkyl(meth)acrylic monomers or glycidyl (meth)acrylate monomers such as described in WO 91/01748 may also be used.

β-hydroxyalkylamides which contain at least one, preferably two, bis(β-hydroxyalkyl)amide groups are especially preferred. Such compounds have for example been described in US-A-4727111.

Examples of polyisocyanate crosslinking compounds include those which are based on isophorone diisocyanate blocked with ε-caprolactam, commercially available as Vestagon®B1530, Ruco®NI-2 and Cargill®2400 or toluene-2,4-diisocyanate blocked with E-caprolactam, commercially available as Cargill®2450, and phenol-blocked hexamethylene diisocyanate.

Another class of blocked polyisocyanate compounds which may be employed are adducts of the 1,3-diazetidine-2,4-dione dimer of isophorone diisocyanate and a diol, wherein the ratio of NCO to OH-groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70 to 130° C. Such an adduct is commercially available under the name Vestagon® BF1540.

On the other hand, when thermosetting coating compositions based on unsaturated polyesters, in particular based on the (meth)acryloyl functional polyesters of the invention, are considered, polymerization initiators such as azobis-based initiators or peroxides can be added to the formulation. Examples of these initiators include 2,2' azobisisobutylnitrile, 2,2' azobis(2,4-dimethylvaleronitrile), laurylperoxide, di-t-butylperoxide, bis(4-t-butylcyclohe-xyl)peroxydicarbonate, t-butylperoxy(2-ethylhexanoate), methylethylketone peroxide and benzoylperoxide.

Optionally, also one or more cohardeners selected from ethylenically unsaturated monomers and/or oligomers can be added, of which particularly suited examples are given infra.

Yet another aspect of the invention concerns a radiation curable coating composition comprising at least one (meth)acryloyl-functional polyester of the invention and at least one ethylenically unsaturated monomer and/or oligomer.

When used in radiation curable coating compositions, the (meth)acryloyl-functional polyester of the invention, advantageously is formulated with one or more ethylenically unsaturated monomers and/or oligomers, thus constituting the binder of the coating formulation. The binder may further comprise at least one photo-initiator, and, optionally, at least one photo-activator. Photo-initiators are typically added when the radiation curable composition of the invention is cured under UV radiation or actinic radiation but is not needed when cured using e.g. electron beams.

The photo-initiators which can be used according to the present invention are chosen from those commonly used for this purpose.

Appropriate photo-initiators which can be used, are e.g. aromatic carbonyl compounds, such as benzophenone and its alkylated or halogenated derivatives, anthraquinone and its derivatives, thioxanthone and its derivatives, benzoin ethers, aromatic or non-aromatic alphadiones, benzil dialkyl acetals, acetophenone derivatives and phosphine oxides.

Particularly suited photo-initiators are, for example, 2,2'-diethoxylacetophenone, 2-, 3- or 4-bromoacetophenone, 2,3-pentanedione, hydroxycyclohexylphenylketone, benzaldehyde, benzoin, benzophenone, 9,10-dibromoanthracene, 2-hydroxy-2-methyl-1-phenylpropan-1-one, 4,4'-dichlorobenzophenone, xanthone, thioxanthone, benzildimethylketal, diphenyl (2,4,6-trimethylbenzyl)phosphine oxide, and the like.

It may optionally be advantageous to use a photo-activator, such as tributylamine, 2-(2-aminoethylamino)ethanol, cyclohexylamine, diphenylamine, tribenzylamine or aminoacrylates such as, for example, the addition product of a secondary amine, such as dimethylamine, diethylamine, diethanolamine, and the like, with a polyol polyacrylate, such as the diacrylate of trimethylolpropane, 1,6-hexanediol, and the like.

The radiation curable coating compositions in accordance with the invention can contain from 0 to 15 and preferably 0.5 to 8 parts of photo-initiators for 100 parts by weight of the binder.

A radiation curable coating composition of the invention advantageously comprises up to 20% by weight and preferably up to 10% of an ethylenically unsaturated monomer and/or an ethylenically unsaturated oligomer, which preferably is selected from the triacrylate and the trimethacrylate of tris(2-hydroxyethyl)isocyanurate, the epoxy acrylates and methacrylates which are formed by the reaction of an epoxy compound (for example, the diglycidyl ether of Bisphenol A with acrylic or methacrylic acid, the urethane acrylates and urethane methacrylates which are formed by the reaction of an organic di- or polyisocyanate with an hydroxyalkylacrylate or a hydroxyalkylmethacrylate and optionally a mono- and/or polyhydroxylated alcohol (for example, the reaction product of hydroxyethyl(meth)acrylate with toluenediisocyanate or isophoronediisocyanate), the acrylic acrylates or acrylic methacrylates, such as, for example, the reaction product of (meth)acrylic acid with a copolymer containing glycidyl groups obtained by copolymerisation of acrylic monomers, such as n-butylmethacrylate and methylmethacrylate, and the like.

A radiation curable composition of the invention advantageously comprises up to 50% by weight, preferably up to 30% by weight and more preferably up to 10% by weight of an ethylenically unsaturated (hydrogenated)polyphenoxy and/or acrylic copolymer and/or semi-crystalline polyester and/or polyesteramide and/or polyurethane.

Examples of suitable diluting monomers that may be used include: beta-carboxyethyl acrylate, butyl(meth)acrylate, methyl(meth)acrylate, isobutyl (meth)acrylate, 2-ethylhexyl (meth)acrylate, cyclohexyl (meth)acrylate, n-hexyl (meth)acrylate, isobornyl (meth)acrylate, isooctyl (meth)acrylate, n-lauryl (meth)acrylate, octyl/decyl (meth)acrylate, 2-hydroxyethyl(meth)acrylate, phenoxyethyl(meth)acrylate, nonylphenolethoxylate mono(meth)acrylate, 2-(-2-ethoxyethoxy)ethyl(meth)acrylate, 2-butoxyethyl (meth)acrylate, neodecanoic acid glycidyl ester (meth)acrylate, N-vinyl pyrolidone, 1,6-hexanediol diacrylate (HDDA), pentaerythritoltriacrylate (PETIA), trimethylolpropanetriacrylate (TMPTA), dipropopyleneglycol diacrylate (DPGDA), phenylglycidyletheracrylate, and the (meth)acrylated ethoxylated or/and propoxylated derivatives thereof (such as (meth) acrylated ethoxylated or/and propoxylated trimethylolpropane, glycerol, neopentylglycol and/or pentaerythritol).

Yet a further aspect of the invention concerns a coating composition that can be cured by heat and by radiation. For dual cure application a combination of both the principles of heat- and radiation curable coating formulations, can be introduced.

The coating compositions of the invention may further comprise additional substances, including rheological agents such as Rheocin R (Ashland), AC 540A (Honeywell), Disparlon PL-525 (Kusumoto), flow control agents such as Resiflow PV5 (Worlee), Modaflow (Cytec Surface Specialities), Acronal 4F (BASF), pigment dispersion agents such as Solplus D510 (Lubrizol) or Disperbyk-180 (BYK), leveling agents such as the one claimed in WO 2009/095460 and degassing agents such as benzoin (BASF) etc.

A particular embodiment of the present invention relates to thermosetting or radiation curable powder coating compositions, and in particular to thermosetting powder coating compositions. If the coating composition is a powder coating composition then the binder can further comprise various additional substances conventionally used in the manufacture of powder paints and varnishes. Examples thereof are tribo additives such as Additol P 950 (Cytec Surface Specialities), UV-light absorbers such as Tinuvin 900 (Ciba), hindered amine light stabilizers represented by Tinuvin 144 (Ciba), other stabilising agents such as Tinuvin 312 and 1130 (Ciba), antioxidants such as Irganox 1010 (Ciba) and stabilisers from the phosphonite or phosphite type.

While most or all of these additives generally are added to the powder coating formulation upon its preparation they nevertheless can be added to the polyester during or at the end of its synthesis when still at the molten stage, or while leaving the reactor.

Both, pigmented systems as well as clear lacquers can be prepared.

A variety of dyes and pigments that can be utilised in the coating compositions, in particular the powder coating compositions of the invention. Examples of useful pigments and dyes are: metallic oxides such as titaniumdioxide, ironoxide, zincoxide and the like, metal hydroxides, metal powders, sulphides, sulphates, carbonates, silicates such as ammoniumsilicate, carbon black, talc, china clay, barytes, iron blues, leadblues, organic reds, organic maroons and the like.

Further provided in the invention is a process for preparing a powder coating composition of the invention. The components of the powder coating composition according to the invention may be mixed by dry blending in a mixer or blender (e.g. drum mixer). The premix is then in general is homogenised at temperatures of 60° C. to 100° C. in a single screw extruder such as the BUSS-Ko-Kneter or a double screw extruder such as the PRISM or APV. The extrudate, when cooled down, is then typically grounded to a powder with a particle size ranging from 10 to 150 μm. The powder coating composition of the invention may be deposed on the substrate by use of a powder gun such as an electrostatic CORONA gun or TRIBO gun. On the other hand well known methods of powder deposition such as the fluidised bed technique can be used.

After deposition, the powder advantageously in general is heated to a temperature between 100° C. and 250° C. for a time of e.g. approximately 0.5 to 30 minutes, causing the particles to flow and fuse together to form a smooth, uniform, continuous coating on the substrate surface. When radiation curable powders are concerned, the coating in the molten state is cured by UV irradiation or by irradiation with accelerated electron beams. For dual cure applications, the cured coating is post-heated in order to get a further curing especially at these regions where curing through irradiation is incomplete (hidden zones).

Coating compositions of the invention, especially the powder coating compositions of the invention, can be applied to the most diverse substrates, such as, for example, paper, cardboard, wood, textile, plastics, such as polycarbonates, poly (meth)acrylates, polyolefins, polystyrenes, poly(vinyl chloride)s, polyesters, polyurethanes, polyamides, copolymers such as acrylonitrile-butadiene-styrene (ABS) or cellulose acetate butyrate, and the like as well as on metals of different nature such as e.g. copper, aluminium, steel, etc.

Coatings obtained from a powder coating composition according to the invention resulted in coatings exhibiting excellent flow and outstanding flexibility.

Coating compositions of the invention comprising at least one polyester of the present invention are as such particularly useful in coil- and food-contact applications especially can coating including these for coating the interior of metal cans more particular those holding alcoholic beverages. This is particularly the case for powder coating compositions.

Also liquid coating compositions of the invention proved very suitable these purposes and in particular for coil and can coating.

The polyesters of the invention, in particular hydroxyl-functional polyesters of the invention can also be used in the preparation of ethylenically unsaturated polymers such as a polyurethane polymer. Preferred are water-dispersible polyurethane polymers.

Usually such water-dispersible polyurethane polymers are prepared from an isocyanate-terminated polyurethane prepolymer.

This isocyanate-terminated polyurethane prepolymer typically is formed by reacting at least:
(i) a molar excess of a polyisocyanate; with
(ii) a hydroxyl-terminated polyester according to the present invention;
(iii) optionally an organic compound containing at least two isocyanate-reactive groups that is different from (ii); and
(iv) an isocyanate-reactive compound containing hydrophilic groups that render the prepolymer dispersible in aqueous medium, either directly or after the reaction with a neutralizing agent to provide a salt.

The polyisocyanate (i) used according to the present invention for the preparation of the isocyanate-terminated polyurethane prepolymer may be an aliphatic, cycloaliphatic, or aromatic polyisocyanate as well known in the art. Diisocyanates or adducts thereof are often preferred. The total amount of the polyisocyanate (i) used typically ranges from 10 to 60% by weight of the polyurethane polymer, preferably of from 20 to 50% by weight and more preferably of from 30 to 40% by weight.

The optionally present organic compounds (iii) containing at least two isocyanate-reactive groups that are used or the preparation of the isocyanate-terminated polyurethane prepolymer may be polyester polyols, polyether polyols, polycarbonate polyols, polyacetal polyols, polyesteramide polyols or polythioether polyols. Polyester polyols, polyether polyols and polycarbonate polyols are preferred. Preferred are compounds that have a number average molecular weight within the range of 400 to 5,000.

Isocyanate-reactive compounds (iv) typically include the compounds containing dispersing anionic groups which are necessary to render the polyurethane prepolymer self-dispersible in water such as sulfonate salt or carboxylate salt groups.

Particularly preferred are anionic salt functional groups selected from the group consisting of the —COOM and —SO3 M groups, preferably the —COOM group, wherein M represents an alkali metal or an ammonium, tetraalkylammonium or tetraalkylphosphonium group. The pendant anionic salt group content of the polyurethane polymer may vary within wide limits but should be sufficient to provide the polyurethane with the required degree of water-dispersibility. Typically, the total amount of these anionic salt group-containing compounds in the polyurethane polymer is of from 1 to 25% by weight of the polyurethane polymer, preferably of from 4 to 10% by weight. Alternatively the pendant hydrophilic groups that render the polyurethane prepolymer dispersible in water are acid groups that preferably are selected from carboxyl acid, sulphonic acid and/or phosphoric acid groups.

The preparation of the isocyanate-terminated polyurethane prepolymer can be carried out in conventional manner, by reacting a stoichiometric excess of the organic polyisocyanate(s) (i) with compounds (II) through (iv) under substantially anhydrous conditions, at a temperature between 50 and 120° C., preferably between 70 and 95° C., until the reaction between the isocyanate groups and the isocyanate-reactive groups is substantially complete. This reaction may be facilitated by the addition of 5 to 40% by weight, preferably 10 to 20% by weight of a solvent, in order to reduce the viscosity of the prepolymer if this would appear to be necessary. Suitable solvents, used either alone or in admixture, are those which are unreactive with isocyanate groups such as ketones, esters and amides such as N,N-dimethylformamide, N-cyclohexylpyrrolidine and N-methylpyrrolidone. Preferred are ketones and esters with a relatively low boiling point such as acetone, methyl ethyl ketone, diisopropyl ketone, methyl isobutyl ketone, methyl acetate and ethyl acetate.

If desired, the preparation of the isocyanate-terminated polyurethane prepolymer may be carried out in the presence of any of the known catalysts suitable for polyurethane preparation such as amines and organometallic compounds.

During the preparation of the isocyanate-terminated polyurethane prepolymer the reactants (i) through (iv) are generally used in proportions corresponding to a ratio of isocyanate groups to isocyanate-reactive groups of from about 1.1:1 to about 4:1, preferably from about 1.3:1 to 3:1.

Any acid groups which may be present in the polyurethane prepolymer are preferably converted to anionic salt groups by neutralization of said groups, before or simultaneously with the preparation of an aqueous dispersion of this prepolymer. The dispersion process of the polyurethane prepolymer is well known to those skilled in the art, and needs rapid mixing with a high shear rate type mixing head. Preferably, the polyurethane prepolymer is added to the water under vigorous agitation or, alternatively, water may be stirred into the prepolymer.

Examples of suitable neutralizing agents include volatile organic bases and/or non-volatile bases as well known in the art. The total amount of these neutralizing agents should be calculated according to the total amount of acid groups to be neutralized. Preferably they are used in an excess of from 5 to 30% by weight, preferably 10 to 20% by weight.

The isocyanate functional prepolymer thus obtained further can be put into reaction with an active hydrogen-containing chain extender (v) and/or an unsaturated compound (vi) that have in their molecule at least one unsaturated function, such as acrylic, methacrylic or allylic functions and at least one nucleophilic function capable of reacting with isocyanates. The acrylic functionality is preferred for its higher reactivity. Particularly suitable are the acrylic or methacrylic esters with polyols, in which at least one hydroxy functionality remains free, like hydroxyalkyl(meth)acrylates having 1 to 20 carbon atoms in the alkyl group and having a linear or branched structure. Examples of mono-unsaturated compounds are hydroxyethylacrylate, hydroxypropylacrylate or hydroxybutylacrylate and the like. Examples of polyunsaturated compounds are trimethylolpropane diacrylates, glycerol diacrylates, pentaerythritol triacrylate, ditrimethylolpropane triacrylate and their polyethoxylated, polypropoxylated or bloc copolymer equivalents. Those products that provide a final composition with a non-irritant character are preferred. For this reason, the monounsaturated products as well as the ditrimethylolpropanetriacrylate are especially appropriate.

The acrylated chain terminating agent (vi) can be used in such a manner that it is fully converted during the reaction with the available isocyanate groups of the polyurethane prepolymer, i.e. the molar ratio of the said isocyanate groups to the hydroxyl groups is preferably between 1.0 and 2.0. It might be wished for very specific requirements that this ratio is inferior to 1. In particular, it is possible to add non-hydroxylated polyunsaturated compounds that will not react with the isocyanate groups of the prepolymer, and in an excess between 5-50%, preferably between 20-30% based on the weight of the prepolymer to enhance the crosslinking density of the polymer after irradiation.

Aqueous polyurethane polymer dispersions may be prepared by dispersing the isocyanate- and/or ethylenically unsaturated group terminated polyurethane prepolymer (optionally in the form of a solution in an organic solvent) in an aqueous medium, and optionally chain-extending the prepolymer with an active hydrogen-containing chain extender (v) in the aqueous phase. The active hydrogen-containing chain extender (v) which may be used to react with the isocyanate-terminated polyurethane prepolymer is suitably a water-soluble aliphatic, alicyclic, aromatic or heterocyclic primary or secondary polyamine having up to 80, preferably up to 12 carbon atoms, or water. In the latter case, a fully reacted polyurethane polymer is obtained with no residual free isocyanate groups.

Chain extension reaction is generally carried out at a temperature between 5° C. and 90° C., preferably between 20° C. to 50° C. When the chain extender is other than water, for example a polyamine, it may be added to the prepolymer before or after the dispersion in an aqueous medium containing the neutralizing agent for the chain-pendant acid groups. According to another embodiment, the prepolymer may be chain extended to form the polyurethane polymer while dissolved in an organic solvent, followed by the addition of water to the polymer solution until water becomes the continuous phase and the subsequent removal of the solvent by distillation to form a pure aqueous dispersion of the polyurethane polymer. Localized amine concentration gradients are preferably avoided by forming previously an aqueous solution of the polyamine used for the chain extension and adding slowly this solution to the polyurethane prepolymer dispersion.

An aspect of the invention relates to an ethylenically unsaturated polymer, in particular a water-dispersible polyurethane as described above.

Yet another aspect of the invention relates to a radiation curable composition, more in particular an aqueous radiation curable composition comprising at least one ethylenically unsaturated polymer, in particular at least one water-dispersible polyurethane according to the invention. Coating compositions comprising such polymers exhibit good flexibility and stain and solvent resistance.

When liquid radiation curable coating compositions are considered, whether solvent-less, solvent based or water-dispersed, one or more photoinitiators well known in the art may be added. Photoinitiators preferably are used in a concentration from 0.1 to 10%.

The radiation curable compositions of the invention also may contain inhibitors such as ydroquinone, toluhydroquinone, monomethyl ether hydroquinone, tert-butyl hydroquinone, di-tert-butyl hydroquinone and/or phenothiazine. The amount of inhibitor used is preferably from 0 to 0.5% by weight.

The radiation curable composition can be applied by any conventional method including dip coating, spray coating, electrostatic coating, film coating, curtain coating, vacuum application, roll coating, knife coating or by engraving cylinders and the like to any substrate including wood, fabrics, paper, plastics, fiberboard, cardboard, glass, glass fibers, ceramics, concrete, leather, metals and the like, for industrial or domestic purposes.

The application of the curable resin to the substrate can be done at any suitable temperature, usually from 10 to 80° C., preferably at room temperature.

After the coating of the substrate with the radiation curable composition, the latter is cured. Solvent or water, where present, can be evaporated before or during the curing process. Curing, i.e. polymerization can be achieved by any suitable means well known to those skilled in the art. The irradiation curing can be done by using UV light or ionizing radiation such as gamma rays, X-rays or electron beam. In the process according to the invention, electron beam and especially UV-radiation are preferred. For curing the compositions according to the invention by an accelerated electron beam, it is not necessary to use a photoinitiator, since this type of radiation produces by itself a sufficient quantity of energy to produce free radicals and to ensure that curing is extremely rapid.

Further provided in the invention is an article coated, partially or entirely, with a coating composition of the invention.

Further provided in the invention is a process for coating an article, partially or entirely, with a with a coating composition, said process comprising the steps of applying to at least one surface of the article a coating composition, followed by a step of curing the applied coating composition. The coating used can be a powder coating composition, that is either a thermosetting or a radiation curable coating composition, more in particular is a thermosetting powder coating composition.

As mentioned above the coating composition that is used can, however, also be a liquid thermosetting or radiation curable coating composition.

The examples which will follow, illustrate the invention without limiting it. Except when otherwise indicated, the parts mentioned throughout the description and in the examples are parts by weight.

EXAMPLE 1

Step 1

A mixture of 215.0 parts of isosorbide, 19.8 parts of glycerol along with 1.0 part of tetra-n-butyl titanate catalyst is placed in a conventional four-neck round bottom flask.

The flask contents are heated while stirring, under nitrogen to a temperature of circa 160° C. Thereupon 572.0 parts of recycled polyethylene terephthalate are slowly added while stirring and while the mixture is gradually heated to a temperature of 230° C.

After 3 hours at 230° C., the reactor is cooled down to 160° C.

Step 2

A mixture of 245.4 parts of succinic acid along with 1.0 part of tributylphosphite and 1.0 part of butylstannoic acid are added to the hydroxyl functionalized prepolymer of step 1. Thereupon the mixture is gradually heated to 230° C. After a two-hour period at 230° C. a vacuum of 50 mm Hg is gradually applied until following characteristics are obtained:
AN=35.2 mg KOH/g
OHN=5.5 mg KOH/g
Brfld$^{200°\ C.}$=7380 mPa·s
Tg$^{quenched}$ (DSC, 20°/min)=56° C.

Step 3

To the carboxyl-functional polyester, standing at 230° C., 5.0 parts of ethyltriphenylphos-phonium bromide are added while stirring under nitrogen. The reactor is emptied after 30 minutes of mixing.

EXAMPLE 2

Step 1

In the same way as in Example 1, a mixture of 128.4 parts of isosorbide, 21.5 parts of glycerol 1.0 part of tetra-n-butyl titanate and 738.7 parts of recycled polyethylene terephthalate are reacted for 3 hours at a temperature of 230° C. Vacuum then gradually is applied in order to distill of 70.0 parts of ethylene glycol so that a hydroxyl-functional prepolymer with a hydroxyl number of 100 mg KOH/g is obtained. The reaction mixture then is cooled down to 160° C.

Step 2

To the hydroxyl-functional prepolymer of step 1, standing at 160° C., 131.9 parts of succinic acid acid along with 1.0 part of tributylphosphite and 1.0 part of butylstannoic acid then are added. Thereupon the mixture is gradually heated to 230° C. After a two-hour period at 230° C. a vacuum of 50 mm Hg is gradually applied until following characteristics are obtained:
AN=53.1 mg KOH/g
OHN=5.2 mg KOH/g
Brfld$^{200°\ C.}$=1650 mPa·s
Tg$^{quenched}$ (DSC, 20°/min)=54° C.

Step 3

To the carboxyl-functional polyester, standing at 230° C., 5.0 parts of ethyltriphenylphos-phonium bromide are added as in Example 1.

EXAMPLE 3

In the same way as in Example 1, a mixture of 204.8 parts of isosorbide, 10.7 parts of glycerol 1.0 part of tetra-n-butyl titanate and 620.2 parts of recycled polyethylene terephthalate are reacted for 3 hours at a temperature of 230° C. until a hydroxyl number of 200 mg KOH/g is obtained. The reaction mixture then is cooled down to 160° C.
Step 2
To the hydroxyl functional prepolymer of step 1, standing at 160° C., 215.7 parts of succinic acid along with 1.0 part of tributylphosphite and 1.0 part of butylstannoic acid then are added. Thereupon the mixture is gradually heated to 230° C. After a two-hour period at 230° C. a vacuum of 50 mm Hg is gradually applied until following characteristics are obtained:
AN=26.7 mg KOH/g
OHN=7.6 mg KOH/g
Brfld$^{200°\ C.}$=8710 mPa·s
Tg$^{quenched}$ (DSC, 20°/min)=58° C.
Step 3
To the carboxyl functionalised polyester, standing at 230° C., 5.0 parts of ethyltriphenylphosphonium bromide are added as in Example 1.

EXAMPLE 4

In the same way as in Example 1, a mixture of 210.2 parts of isosorbide, 15.2 parts of glycerol 1.0 part of tetra-n-butyl titanate and 650.8 parts of recycled polyethylene terephthalate are reacted for 3 hours at a temperature of 230° C. until a hydroxyl number of 220 mg KOH/g is obtained. The reaction mixture then is cooled down to 160° C.
Step 2
To the hydroxyl functional prepolymer of step 1, standing at 160° C., 168.0 parts of succinic acid along with 1.0 part of tributylphosphite and 1.0 part of butylstannoic acid then are added. Thereupon the mixture is gradually heated to 230° C. After a two-hour period at 230° C. a vacuum of 50 mm Hg is gradually applied until following characteristics are obtained:
AN=6.0 mg KOH/g
OHN=32.5 mg KOH/g
Brfld$^{200°\ C.}$=9300 mPa·s
Tg$^{quenched}$ (DSC, 20°/min)=58° C.
Step 3
To the hydroxyl-functional polyester, standing at 200° C., 6.7 parts of dibutyl dilaurate are added as in Example 1.

EXAMPLE 5

Step 1

In the same way as in Example 1, a mixture of 229.1 parts of isosorbide, 10.2 parts of glycerol 1.0 part of tetra-n-butyl titanate and 595.3 parts of recycled polyethylene terephthalate are reacted for 3 hours at a temperature of 230° C. The reaction mixture then is cooled down to 160° C.

Step 2

To the hydroxyl functional prepolymer of step 1, standing at 160° C., 101.9 parts of succinic acid along with 1.0 part of tributylphosphite and 1.0 part of butylstannoic acid then are added. Thereupon the mixture is gradually heated to 230° C. After a two-hour period at 230° C. a vacuum of 50 mm Hg is gradually applied until following characteristics are obtained:
AN=40 mg KOH/g
OHN=3 mg KOH/g
Brfld$^{200° C.}$=7200 mPa·s Step 3

The carboxyl-functional polyester is cooled down to 150° C. and 0.9 parts of di-t-butylhydroquinone along with 4.9 parts of ethyltriphenylphosphonium bromide are added. Subsequently 71.7 parts of glycidylmethacrylate is slowly added (30 minutes) while stirring under oxygen. An hour after the addition is ended, a (meth)acryloyl unsaturated polyester with the following characteristics is obtained
AN=1 mg KOH/g
OHN=39 mg KOH/g
unsaturation=0.6 meq/g
Brfld$^{200° C.}$=5400 mPa·s
Tg$^{quenched}$ (DSC, 20°/min)=57° C.

EXAMPLES 6 to 9

The polyesters of Examples 1 to 3 are formulated with Araldite GT 7004, thus constituting the binder,
The polyester of Example 4 is formulated with Vestagon B1530, thus constituting the binder, accordingly the white powder formulation (1) as given below:

| Binder | 690.6 parts |
| Kronos 2310 | 296.0 parts |
| Modaflow P6000 | 9.9 parts |
| Benzoin | 3.5 parts |

EXAMPLE 10

The polyester of Example 1 is formulated with Primid XL552, thus constituting the binder, accordingly the brown powder formulation (2) as given below:

| Binder | 783.3 parts |
| Bayferrox 130 | 44.4 parts |
| Bayferrox 3950 | 138.0 parts |
| Carbon Black FW2 | 10.9 parts |
| Modaflow P6000 | 9.9 parts |
| Benzoin | 3.5 parts |

EXAMPLE 11

The polyester of Example 5 is formulated accordingly the powder formulation (3) as given below:

| Polyester Example 5 | 750.0 parts |
| Kronos 2310 | 250.0 parts |
| Irgacure 2959 | 12.5 parts |
| Irgacure 819 | 12.5 parts |
| Modaflow P6000 | 10.0 parts |

The powders are prepared first by dry blending of the different components and then by homo-genisation in the melt using a PRISM 16 mm L/D 15/1 twin screw extruder at an extrusion temperature of 85° C. The extrudate is ground in a grinder of Alpine 100UPZ (from the company Alpine and subsequently sieved in order to obtain a size of the particles between 10 and 110 μm.
The powder thus prepared is deposited on cold rolled steel with a thickness of 0.8 mm, by electrostatic deposition using the GEMA—Volstatic PCG 1 spraygun at a voltage of 60 kV, in such a way that a film thickness of the cured coating of about 80 μm is obtained.

EXAMPLES 6 to 10

The panels comprising the coatings obtained from the polyesters of Example 1 to 4, then are transferred to an air-ventilated oven, where curing proceeds for 15 minutes at a temperature of 180° C. for the coatings of Example 6 to 10.

EXAMPLE 11

The panel comprising the coating obtained from the polyesters of Example 5 then is subjected to melting step in a medium wavelength infrared/convection oven (Triab) at a temperature of 140° C. during a time of approximately 3 minutes, and subsequently is subjected to irradiation with ultraviolet light emitted by a 160 W/cm Gallium-doped and/or a 160 W/cm medium-pressure mercury vapour UV-bulb (Fusion UV Systems Ltd.) with a total UV-dose of 4000 mJ/cm$^2$.

The cured coatings thus obtained are subjected to conventional tests. The results obtained are reported in the table below in which:
column 1: number of the example of the formulation/coating
column 2: number of the example of the polyester
column 3: ratio polyester/hardener
column 4: indicates the 60° gloss, measured according to ASTM D523 column 5: indicates the direct impact strength (DI) and the reverse impact strength(RI) according to ASTM D2794. The highest impact, which does not crack the coating is recorded in kg.cm.
column 6: indicates the Erichsen slow embossing according to ISO 1520.
The highest penetration which does not crack the coating is recorded in mm
column 7: resistance to MEK, which corresponds to the number of twofold rubbing movements (to and fro) with a cotton pad impregnated with MEK which does not detrimentally affect the appearance of the surface of the cured film

TABLE 1

| Coating Example | Polyester Example | Pester/ hardener ratio | Gloss 60° | DI/RI | Erichsen | MEK resistance |
|---|---|---|---|---|---|---|
| Ex. 6 | Ex. 1 | 70/30 | 99 | 200/200 | 10.1 | >100 |
| Ex. 7 | Ex. 2 | 60/40 | 98 | 200/200 | 9.0 | >100 |
| Ex. 8 | Ex. 3 | 75/25 | 100 | 200/200 | 9.1 | >100 |
| Ex. 9 | Ex. 4 | 88/12 | 100 | 200/200 | 9.5 | >100 |

TABLE 1-continued

| Coating Example | Polyester Example | Pester/ hardener ratio | Gloss 60° | DI/RI | Erichsen | MEK resistance |
|---|---|---|---|---|---|---|
| Ex. 10 | Ex. 1 | 95/5 | 97 | 200/200 | 9.3 | >100 |
| Ex. 11 | Ex. 5 | 100/0 | 99 | 180/180 | 9.0 | >100 |

As appears from the table above, the powder coatings comprising the polyesters of the present invention show an outstanding flexibility (DI/RI), confirmed by the T-bending test. The coatings as obtained from the polyesters of Example 1 to 5, all comply with the O-T bend test.

The coating of Example 10 also has been submitted to the Q-UV accelerated weathering tester (Q-Panel Co) according to ASTM G53-88 (standard practice for operating light and water exposure apparatus—fluorescent UV/condensation type—for exposure of non metallic materials).

The panels used in the Q-UV are yellow chromated aluminium ones. Hereto the panel is subjected to the intermittent effects of condensation (4 hours at 40° C.) as well as the damaging effects of sunlight simulated by fluorescent UV-B lamps (313 nm, I=0.75 W/m$^2$/nm) (4 hours at 50° C.). After 200 hrs of QUV-B, the gloss 60° value is reduced to 50% of its initial value.

EXAMPLES 12 to 13

A polyester-polyol is synthesized as follows: A mixture of diethylene glycol (DEG), isosorbide (isoS) and an esterification-catalyst (300-500 ppm Sn corresponding to 0.15-0.25% by weight of Fascat 4102) are heated to 160° C. in a conventional four neck round bottom flask equipped with a stirrer, a distillation column connected to a water cooled condenser, an inlet for nitrogen and a thermocouple attached to a thermoregulator.

While stirring, recycled polyethylene terephthalate (PET) is slowly added meanwhile the mixture is heated to 230° C.

When all PET is added, the reaction mixture is kept for 2 hrs at 230° C. The reaction mixture then is cooled down to about 150° C., and succinic acid (SA) and isophthalic (iPA) are added. When all succinic acid and isophthalic acid is added, the reaction mixture is heated again to 230° C.

After 2 hr at 230° C., vacuum is gradually applied till 50 mm Hg and maintained until the right resin characteristics (hydroxyl number and acid number) are obtained.

According to the procedure above the polyester-polyols of examples 12 and 13 were prepared:

TABLE 2

|  | Example 12 | Example 13 |
|---|---|---|
| PET | 290.162 | 206.03 |
| iPA | 151.843 | 89.96 |
| SA | 198.178 | 324.49 |
| DEG | 190.612 | 341.36 |
| IsoS | 262.496 | 156.70 |
| —H$_2$O | −93.446 | −118.54 |
| OHN (mg KOH/g) | 89 | 125.7 |
| AN (mg KOH/g) | 8.8 | 5.7 |

EXAMPLE 14

886.08 parts of the polyester of Example 13, 151.90 parts of acrylic acid, 23.1 parts of methanesulphonic acid (70%), 0.8 parts of methyl ether hydroquinone and 521.0 parts of toluene are mixed in a double-wall glass reactor equipped with a stirrer, a thermocouple attached to a thermoregulator, a gas inlet tube, a connection to vacuum and an azeotropic distillation column and heated to a temperature of about 120° C. Esterification is continued until no more water is distilled over. The mixture then is cooled down to 60° C. and another 521.0 parts of toluene are added. The mixture then is washed three times with 10% by weight of the reaction mixture of a 16% by weight Na$_2$SO$_4$/water solution, and dried via azeotropic distillation. Subsequently the toluene is distilled of under a vacuum of about 30 mm Hg and the reaction product is filtered. To the acrylate end-capped polyester thus obtained, tri(propyleneglycol) diacrylate is added in such an amount that the final mixture consists of 80% by weight of the acrylate end-capped polyester and of 20% by weight of tri(propyleneglycol) diacrylate.

EXAMPLE 15

211.8 parts of the polyester of Example 12 are diluted, at room temperature, in 141.2 parts of methoxypropylacetate by using a Dispermat with a 25 mm diameter dispersing disc at 1200 rpm. Then, 297.1 parts of Kronos 2190 (TiO$_2$-pigment) is gradually added in a 5 minutes period to the polyester solution while mixing at 1250 to 1800 rpm. When the pigment addition is completed, the mixing speed is increased to 5750 rpm for 10 minutes until a pigment agglomerate size of less than 4 μm, as measured by a Grindometer, is obtained.

To the pigment paste, thus obtained, subsequently is added, while manually stirring, 116.7 parts of a solution consisting of 70.0 parts of the polyester of Example 12 and 46.7 parts of methoxypropylacetate, 94.4 parts of Cymel 303 LF (highly methylated melamine crosslinker from Cytec), 4.2 parts of Cycat 4040 (crosslinking catalyst based on 40% weight of p-toluenesulphonic acid in isopropanol, from Cytec), 130 parts of methoxypropylacetate and 4,4 parts of Additol XL 122 N (flow, wetting and slip promoter from Cytec).

The paint formulation, thus obtained, after sieving over a 20 μm sieve, then is applied, using a block applicator with a gauge of 60 μm, on 0.21 mm thickness primed aluminum panels. After a 45 sec. pre-drying period at room temperature, the panels are transferred to a preheated bench where curing proceeds for 30 sec. at 240° C. (metal temperature). The panels, after standing for 30 sec. at 240° C. then are quenched under rinsing tap water and dried for evaluation.

At a coating thickness of 15 μm, a Knoop film hardness of 19.5 kg/mm$^2$, a Methyl Ethyl Keton resistance of 200 double rubs, a glossy appearance with a film gloss at 20° (ASTM D523) of 76%, an Erichsen slow embossing (ISO 1520) of 7.2 mm and a Bending test (ASTM D4145) of 3-4 is measured.

The performances, as observed for a solvent-borne liquid formulation based on the polyester of Example 12, according the present invention, are comparable with typical nowadays commercial solvent-borne coil coating formulations.

Besides, the coating obtained from the formulation of Example 15 proves to be pasteurization stable (30' at 80° C.), when applied on aluminum panels and retortable for 30 min. at 105° C. and 30 min. at 121° C., when applied on tin panels which both are typical requirements for outside can coating for drinks and food respectively.

EXAMPLE 16

952.4 parts of the acrylate group containing mixture of Example 14 are mixed with 47.6 parts of a photoinitiator blend consisting of 50% by weight of benzophenone and 50% by weight of 1 hydroxy cyclohexyl phenyl ketone (Irgacure 184). The mixture is mechanically stirred for 15 minutes in order to get a homogeneous clear coat formulation.

The radiation curable formulation of Example 16 then is applied on LENETA paper (Form WA—plain white charts) using a bar coater of 20 µm and cured at a speed of 30 m/min using a UV source consisting of a medium pressure mercury vapor lamp with a power of 80 W/cm, whose radiation is concentrated with the aid of a semi-elliptical reflector and with a total dose of 265 mJ/cm$^2$.

The clear coating, thus obtained, proves an outstanding resistance against a 10% ammonia in water solution, against a 50% ethanol in water solution and against isopropanol. Besides, a free film of about 100 µm thickness, obtained after curing at a speed of 20 m/min using 5 successive UV sources, each consisting of a medium pressure mercury vapor lamp with a power of 80 W/cm, whose radiation is concentrated with the aid of a semi-elliptical reflector, and with a total dose of 2400 mJ/cm$^2$, is characterized by a Young Modulus of 23.5 Mpa and proves an Elongation, at break, of 43.5%, indicating a high flexibility of the coating.

EXAMPLE 17

181.90 parts of 1,3-propanediol, 181.9 parts of isosorbide and 1.50 parts of Fascat 4102 (n-butyl tintrioctoate) are heated to 160° C. in a conventional four neck round bottom flask equipped with a stirrer, a distillation column connected to a water cooled condenser, an inlet for nitrogen and a thermocouple attached to a thermoregulator.

While stirring, 281.55 parts of recycled polyethylene terephthalate (PET) are slowly added meanwhile the mixture is heated to 230° C.

When all PET is added, the reaction mixture is kept for 2 hrs at 230° C. The reaction mixture then is cooled down to about 150° C., and 218.05 parts of succinic acid and 83.61 parts of isophthalic are added. When all succinic acid and isophthalic acid is added, the reaction mixture is heated again to 230° C.

After 2 hr at 230° C., vacuum is gradually applied till 50 mm Hg and maintained until an acid number of 3 mg KOH/g and a hydroxyl number of 165 mg KOH/g is obtained.

This polyester-polyol is then used in the preparation of a radiation curable polyurethane dispersion.

EXAMPLE 18

A double-wall glass reactor equipped with a mechanical stirrer, a thermocouple, a vapor condenser and a dropping funnel is charged with. 190.0 parts of the polyester of Example 17, 53.2 parts of dimethylol propionic acid, 24.5 parts of cyclohexane dimethanol, 332.2 parts of tetramethylxylylenediisocyanate, 2.3 parts of Irganox 245, 4.6 parts of Tinuvin 328, 4.6 parts of Tinuvin 622 and 0.6 parts of dibutyltinlaurate solution in acetone (at 10%) as reaction catalyst. The reaction mixture is heated up to 90° C. with stirring, and the condensation process is maintained until the isocyanate content reaches 1.67 meq/g. The polyurethane prepolymer is cooled down to 70° C. and 0.18 parts of 4-methoxyphenol dissolved in 314.9 parts of pentaerytrytoltriacrylate (PETIA) is added to the vessel. The reaction mixture is kept at 70° C., and the end-capping process is maintained until the isocyanate content reaches 0.42 meq/g. Then, 40.6 parts of triethylamine is added as neutralizing agent in the warm prepolymer until homogenous. 1722 parts of water at room temperature is loaded in the reactor under vigorous mixing and beyond the phase inversion point.

A stable polymer dispersion is obtained after about 5 minutes of vigorous mixing, but the agitation is maintained over a period of 1 hour. The product is filtered over a 100 µm sieve. It has a dry content of 32.9%, a pH of 7.8, a particle size of 54 nm and a grits content of <100 mg/l. It contains no solvent.

The dispersions are formulated with 1.5% of Irgacure 500 (a photoinitiator marketed by Ciba). They are applied on white PVC, and cured under UV-light, 80 W/cm whose radiation is concentrated with the aid of a semi-elliptical reflector, at 5 m/min and with a total dose of 1100 mJ/cm2.

The coating thus obtained proves good flexibility and stain resistance as well as an outstanding resistance against a 50% ethanol-solution and against isopropanol.

The invention claimed is:

1. A hydroxyl-functional or a carboxyl-functional polyester comprising moieties of
   (a) terephthalic acid and/or isophthalic acid,
   (b) ethylene glycol,
   (c) a dianhydrohexitol, and of
   (d) one or more linear chain dicarboxylic acids
wherein the polyester has a number average molecular weight, as measured by gel permeation chromatography, of from 400 to 15000 daltons.

2. The polyester of claim 1 comprising, based on the total weight of the polyester:
   (a) from 10% to 80% by weight of moieties of terephthalic acid and/or of isophthalic acid,
   (b) from 5% to 35% by weight of moieties of ethylene glycol,
   (c) from 5% to 40% by weight of moieties of dianhydrohexitol,
   (d) from 5% to 40% by weight of moieties of linear chain dicarboxylic acids, and
   (e) from 0% to 40% by weight of moieties of one or more other polyols (e1) and/or of one or more other polyacids (e2).

3. The polyester of claim 2, wherein the dianhydrohexitol is isosorbide.

4. A (meth)acryloyl-functional polyester prepared from a polyester of claim 1.

5. A coating composition comprising at least one polyester of claim 1.

6. An article coated, partially or entirely, with a coating composition of claim 5.

7. A process to produce a polyester comprising a step of
   (1) glycolysis of a polyethylene terephthalate and/or a polyethylene isophthalate with a dianhydrohexitol, followed
   (2) where needed, by one or more additional steps,
wherein a polyester is produced that is hydroxyl-functional or carboxyl-functional, and that has a number average molecular weight, as measured by gel permeation chromatography, of from 400 to 15000 daltons.

8. The process of claim 7 wherein step (2) comprises a step of chain extension and/or carboxylation of a hydroxyl-functional polyester previously obtained.

9. The process of claim 8 wherein for said chain extension and/or said carboxylation one or more linear chain dicarboxylic acids are used.

10. The process of claim 7 wherein the polyethylene terephthalate and/or of a polyethylene isophthalate used in step (1) is provided under the form of a material comprising said polyethylene terephthalate and/or said polyethylene isophthalate.

11. The process of claim 10 wherein said material is a recycled material.

12. The process of claim 11 wherein said recycled material is recycled polyethylene terephthalate.

13. The process of claim 7 wherein said dianhydrohexitol is isosorbide obtained from a bio-based feedstock.

14. The process of claim 7 further comprising a step of converting a hydroxylfunctional polyester or a carboxyl-functional polyester thus obtained into a (meth)acryloylfunctional polyester.

15. The process of claim 14 wherein a (meth)acryloyl group end-capped polyester is obtained from the reaction of a diisocyanate with a hydroxylalkyl(meth)acrylate and with the terminal hydroxyl groups of a hydroxyl-functional polyester, or from the reaction of a (meth)acrylic acid with the terminal hydroxyl groups of a hydroxyl-functional polyester.

16. The process of claim 14 wherein a (meth)acryloyl group end-capped polyester is obtained from the reaction of glycidyl(meth)acrylate and the terminal carboxyl groups of a carboxylfunctional polyester.

17. The polyester of claim 1, wherein the polyester has a number average molecular weight, as measured by gel permeation chromatography, of from 550 to 15000 daltons.

18. The process of claim 7, wherein a polyester is produced that is hydroxyl-functional or carboxyl-functional, and that has a number average molecular weight, as measured by gel permeation chromatography, of from 550 to 15000 daltons.

\* \* \* \* \*